3,174,895
GRAPHITE CLOTH LAMINATES
David W. Gibson, Fostoria, Ohio, Kenneth B. McGhee, Stamford, N.Y., and Robert C. Stroup, Fostoria, Ohio, assignors to Union Carbide Corporation, a corporation of New York
No Drawing. Filed Sept. 7, 1960, Ser. No. 54,335
9 Claims. (Cl. 161—259)

This invention relates to a new and useful form of artificial graphite and to its method for manufacture, and more particularly, the invention relates to the fabrication of carbon or graphite bonded laminates of graphitized cellulosic colth.

Graphite is a material which is a good conductor of heat and electricity, extremely resistant to high temperatures and also highly resistant to attack by most chemical reagents. Accordingly, graphite is an extremely important and useful material in industry in a great variety of applications.

Graphite appears in nature as one of the two naturally occurring forms of crystalline carbon, the other being diamond. Natural graphite occurs usually as a black soft mass or as crystals of a flaky structure.

In addition, graphite may be artificially manufactured. Almost all the artificial graphite which is made today is prepared according to the teaching first set for by E. G. Acheson in 1896. Acheson's process, which was the first successful process for the commercial production of artificial graphite articles, has of course been somewhat modified since that time. Today, it is well known in the art that almost any amorphous carbon can be converted to a useful form of graphite in an electric furnace. As a general rule, however, artificial graphite articles are fabricated from either a lampblack or a petroleum coke base material.

Relatively small graphite articles such as electrical brush stock are usually made from a lampblack base. This process comprises intimately mixing raw lampblack with coal tar or pitch and briquetting the mixture. These briquettes are calcined at about 1000° C. in order to remove all volatiles and to pre-shrink the lampblack. Following the calcination, the briquettes are milled to a fine flour which is mixed with a coal tar pitch binder. The resultant mixture is molded into the desired article which is initially baked at about 1000° C. to carbonize the binder, and baked at about 3000° C. in an electric furnace to graphitize the article.

Larger graphite articles such as electrodes for electric furnaces are generally made from petroleum coke base material. This process comprises calcining green petroleum coke to remove all volatiles, crushing the calcined material to a small particle size and finally milling a portion of this into a fine flour. The resultant particles and flour are blended to form an aggregate which is mixed with a pitch binder and extruded into the desired shape. The resultant shaped article is baked at about 1000° C. and is subsequently graphitized at 2500° C.–3000° C. in an electric furnace. Graphite electrodes so produced are routinely commercially available in sizes up to 40 inches in diameter.

When either of the above methods is followed, a shaped graphite article is produced, or graphite stock is produced which may be shaped to the desired article by machining or other similar physical processes.

Artificial graphite articles made by the above described conventional processes have found a myriad of uses. Today, with the ever increasing demand for high temperature resistant materials graphite has become a refractory work-horse in scores of industrial and military applications. However, in certain special applications, conventional graphite articles possess several inherent disadvantages, most of which are related to their method of manufacture. For example, the relatively high density of artificial graphite manufactured by conventional processes often prohibits its use in certain refractory applications requiring an exceptionally light weight material which is resistant to thermal shock. In addition, the very nearly isotropic electrical characteristics of such material precludes obtaining maximum effectiveness in certain special electrical applications where a higher degree of anistropicity is desired, such as in brushes and rheostat discs. Furthermore, more effective uses of graphite material in thermal applications could be made were such material more resiliently compressible.

With these limitations in mind, one of the principal objects of the invention is to provide a method of manufacturing a form of artificial graphite which has substantially different physical properties than artificial graphite manufactured by the process of the prior art.

Another object of the invention is to provide a form of artificial graphite which has the accepted chemical properties of conventional graphite in addition to such unusual and desirable physical characteristics as high flexibility, low density combined with reasonable strength, and marked anisotropic electrical properties.

Broadly stated, the objects of the invention are accomplished by an artificial graphite structure which comprises a laminate of graphitized cellulosic sheets bound together by a carbonized or graphitized carbonaceous binder or cement. Generally, this laminated graphite article may be provided by spraying or painting sheets of graphitized cellulosic cloth with a suitable carbonaceous binder or cement, stacking and curing these sheets under pressure and finally baking and graphitizing the resultant article in an inert or reducing atmosphere. Artificial graphite so fabricated results in a laminated graphite structure having a density ranging from 1.00 to 1.34 grams per cubic centimeter and possessing such desirable characteristics as low thermal expansion, good shock resistance, high strength, and marked anisotropic electrical resistivity, i.e., the electrical resistance is five times greater in the transverse direction than in the longitudinal direction.

The term "graphitized cellulosic cloth" as used herein and in the appended claims refers to artificial graphite prepared according to the teaching disclosed in co-pending U.S. application, Serial No. 55,502, filed September 12, 1960, and now Patent 3,107,152, by C. E. Ford and C. V. Mitchell and entitled "Fibrous Graphite," and which is a continuation-in-part of U.S. application Serial No. 781,186, filed December 18, 1958, and now abandoned. It is therein disclosed that both pre-woven and unwoven cellulosic materials among which is included rayon fibers, rayon and viscous rayon cloth, may be graphitized directly by subjecting the cellulosic material to a carefully controlled heating schedule until substantially complete graphitization has taken place. In the practice of this invention, the preferred heating schedule comprises a slow heating stage at temperatures ranging from 100° C. to about 300° C. at a rate of increase of from about 10° C. per hour to about 50° C. per hour, followed by a second heating stage from about 300° C. to 400° C. which is conducted at approximately the same rate or at a 5 to 10 percent faster rate. From 400° C. to about 900° C. heating rates of up to 100° C. rise per hour are employed. From 900° C. to about 3000° C. rapid heating rates up to 3000° C. per hour may be employed. The cellulosic material is preferably positioned in a suitable protective enclosure while passing through the above-described ranges. For example, a metal sagger may be employed while passing through the room temperature to 900° C. range and a graphite capsule is suitable for the 900° C. to 3000° C. range. A protective atmosphere of nitrogen or other inert gases is desirable when passing through the 900° C. to 3000° C. range.

The laminates of the invention may be fabricated by either a stacking or a molding procedure.

In the practice of the stacking technique, a sheet of graphitized cloth is sprayed, or painted, with a carbonaceous binding agent, covered with another sheet of graphitized cloth, sprayed or painted again with the binder, covered with another piece of graphitized cloth, etc., until the desired thickness of stack is reached. The carbonaceous binding agent is then cured at the proper temperature, which depends on the particular binder employed, while the laminate is under a slight stacking pressure of about the order of 10–50 pounds per square inch. After curing, the resin bonded laminate is baked at a temperature of about 900° C. in a reducing or inert atmosphere in order to carbonize the binder. The resultant carbon bonded article is then regraphitized in an inert or reducing atmosphere at about 2900° C. in order to produce a completely graphitic article. If it is desired to produce only a carbon bonded laminate, the regraphitizing procedure is omitted.

A specific example of this embodiment of the invention is as follows:

Several sheets of graphitized cloth were sprayed with a carbonaceous binder commercially available under the trade name "Furatone." "Furatone" is a resin comprising a furfuraldehyde-ketone condensation product composed of a mixture of hydrogenated mono- and di-furfuryl ketones. The sprayed sheets were stacked one on top of each other to a height of 3¾ inches. A pressure varying between 13 and 43 pounds per square inch was applied to the stack, and the binder was then cured at a temperature of 165° C. for two hours. After curing, the laminate was removed from the pressure source and packed in coke preparatory to its being baked therein at a 10° C. per hour temperature rise to 400° C., then at a 60° per hour temperature rise to 900° C., and subsequently heated to a temperature of about 2900° C. in order to graphitize the binder. The flexural strength of laminates so prepared was of the order of 1400 pounds per square inch.

In the practice of the molding technique, strips or sheets of graphitized cloth are painted or sprayed with a suitable carbonaceous binder and placed one on top of each other in a mold to a desired height. The binder in the laminate is then cured under pressure of the order of one to two tons per square inch at the proper temperature, depending on the particular binder employed. After curing, the resin bonded laminate is baked and graphitized in the same manner as laminates prepared by the stacking technique.

A specific example of this embodiment of the invention is as follows:

Several sheets of graphitized cloth were painted with a carbonaceous binder cement comprising 25% furfural, 25% furfural alcohol and 50% 90 coke flour, and placed one on top of each other in a mold. A pressure varying between one and two tons per square inch was applied to the stack for a period of ten minutes. The binder was then cured while under pressure to a temperature of about 130° C. for 10 minutes. After curing, these laminates were baked and graphitized in the same manner as laminates prepared by the stacking technique. The flexural strength of laminates so prepared was of the order of 1750 pounds per square inch.

It is to be noted that the same binding agents may be used with either the stacking or the molding technique, and the preferred binder for either technique, is that which deposits the highest amount of carbonizable coke. Among other suitable binders for use in the practice of the invention are phenolformaldehyde resins, silicone resins, and silicate cement.

The table below gives the average apparent density and the specific resistance for artificial graphite laminates prepared according to the technique of the invention. For comparison, the average values for the same properties are given for conventionally prepared graphite articles. In addition, the change in Young's modulus upon thermal shock is reported for the material of the invention and the material of the prior art. In all cases the modulus is measured by the sonic method before and after heating the material to 2000° C. in nitrogen gas followed by submersion in water at 21° C.

*Table*

| Method of Preparation | Apparent Density, grams/cubic centimeters | Specific Resistance, ohm-inch | | Ratio, L/T | Young's Modulus | | Percent Change |
| --- | --- | --- | --- | --- | --- | --- | --- |
| | | Longitudinal | Transverse | | Before Shock | After Shock | |
| Prior Art: | | | | | | | |
| (a) Lampblack | 1.53 | .0025 | .0025 | 1:1 | 0.0985×10⁶ | 0.0825×10⁶ | 16.25 |
| (b) Petroleum Coke Base | 1.56 | .0003 | .0005 | 1:1.7 | 2.46×10⁶ | 1.95×10⁶ | 20.8 |
| Invention: | | | | | | | |
| (a) Stacking Technique | 1.00 | .0012 | .0056 | 1:4.7 | 0.1040×10⁶ | 0.1027×10⁶ | 1.25 |
| (b) Molding Technique | 1.34 | .0012 | .0056 | 1:4.7 | | | |

It will be noted from the table that the density of the artificial graphite prepared according to the teaching of the invention is appreciably lower than the densities of the artificial graphite of the prior art. Most significantly, the artificial graphite of the invention has marked anisotropic electrical resistivity (the electrical resistance is five times greater in the transverse direction than in the longitudinal direction) while the artificial graphite of the prior art has isotropic or very nearly isotropic electrical resistance. The ability of the laminate of the invention to withstand thermal shock is well brought out in the table wherein the extremely small change in Young's modulus is reported compared with the significant changes in the prior art materials.

Artificial graphite manufactured according to the teaching of the invention is suitable for the fabrication of light weight heat-resistant missile and rocket motor parts. Also, it is suitable for the fabrication of anodes and grids of electronic devices which must have substantially different electrical properties along different axes. Furthermore, this form of artificial graphite is ideal for the fabrication of special graphite structural shapes which must be resistant to corrosion and thermal shock and still possess a high degree of flexibility, such as in the fabrication of various graphite diaphragms, rupture discs and stress absorbing members. In applications calling for a structure of maximum strength and minimum weight, a corrugated or honeycombed form of the subject artificial graphite is extremely useful.

We claim:

1. An artificial graphite article which is composed of a laminate made up of a plurality of graphitized cellulosic sheets which are bound together by a carbonized binder, said article having a density of less than about 1.34 grams per cubic centimeter and characterized by anisotropic electrical resistivity, the electrical resistance being approximately five times greater in the transverse direction than in the longitudinal direction.

2. A process for providing a laminated artifical carbonaceous article which comprises coating the adjacent surfaces of a plurality of sheets of graphitized cellulosic cloth with a carbonaceous binder, stacking said sheets one on top of another, heating said stack under pressure to cure said carbonaceous binder, and baking said article in a non-oxidizing atmosphere at about 900° C. to carbonize said binder.

3. The process of claim 2 wherein a completely graphitized laminate is provided by graphitizing said carbonaceous binder in a non-oxidizing atmosphere at about 2900° C.

4. The process of claim 3 wherein said carbonaceous binder is chosen from the group consisting of phenol-formaldehyde resins, silicone resins, silicate cement and a resin comprising a furfuraldehyde ketone condensation product composed of a mixture of hydrogenated mono- and di-furfuryl ketones.

5. The process of claim 3 wherein said carbonaceous binder is a resin comprising a furfuraldehyde ketone condensation product composed of a mixture of hydrogenated mono- and di-furfuryl ketones and said curing temperature is approximately 165° C.

6. A process for producing a laminated artificial carbonaceous article which comprises coating the adjacent surfaces of a plurality of sheets of graphitized cellulosic cloth with a carbonaceous binder, placing said sheets one on top of another in a mold, heating said stack under pressure to cure said carbonaceous binder, and baking said article in a non-oxidizing atmosphere at about 900° C. to carbonize said binder.

7. The process of claim 6 wherein a completely graphitized laminate is provided by graphitizing said carbonaceous binder in a non-oxidizing atmosphere at about 2900° C.

8. The process of claim 7 wherein said binder comprises 25% furfural, 25% furfural alcohol and 50% 90-coke flour, and said heating temperature is approximately 130° C.

9. The article of claim 1 wherein said binder has been graphitized.

References Cited by the Examiner
UNITED STATES PATENTS

| | | | |
|---|---|---|---|
| 1,370,728 | 3/21 | Bradley | 117—226 |
| 1,379,366 | 5/21 | Seabury | 18—54.7 |
| 1,556,990 | 10/25 | Henry | 260—38 XR |

FOREIGN PATENTS

| | | |
|---|---|---|
| 564,167 | 10/23 | France. |

EARL M. BERGERT, *Primary Examiner.*

CARL F. KRAFFT, *Examiner.*